United States Patent [19]

Polsfuss

[11] 4,425,707

[45] Jan. 17, 1984

[54] COMPRESSION TOOL, USEABLE AS NUTSHELL REMOVER

[76] Inventor: Marvin F. Polsfuss, 676 Silver Ave., San Francisco, Calif. 94134

[21] Appl. No.: 525,261

[22] Filed: Aug. 22, 1983

Related U.S. Application Data

[63] Continuation of Ser. No. 249,849, Apr. 1, 1981, abandoned.

[51] Int. Cl.³ .............................................. A47J 43/26
[52] U.S. Cl. .................................................. 30/120.3
[58] Field of Search ................. 30/120.2, 120.3, 120.4, 30/120.5

[56] References Cited

U.S. PATENT DOCUMENTS

| | | | |
|---|---|---|---|
| 660,763 | 10/1900 | Thompson | 30/120.3 |
| 1,219,859 | 3/1917 | Paxton | 30/120.3 |
| 1,282,278 | 10/1918 | Neumann | 30/120.4 |
| 1,436,571 | 11/1922 | Bokor | 30/120.4 |
| 1,649,468 | 11/1927 | Greene | 30/120.3 |

FOREIGN PATENT DOCUMENTS

| | | | |
|---|---|---|---|
| 466907 | 8/1950 | Canada | 30/120.3 |
| 659185 | 4/1938 | Fed. Rep. of Germany | 30/120.4 |
| 345146 | 11/1904 | France | 30/120.3 |
| 723182 | 4/1932 | France | 30/120.3 |
| 263606 | 9/1949 | Switzerland | 30/120.3 |
| 12005 | of 1889 | United Kingdom | 30/120.3 |
| 1800 | of 1907 | United Kingdom | 30/120.3 |

*Primary Examiner*—Frederick R. Schmidt
*Assistant Examiner*—J. T. Zatarga

[57] ABSTRACT

A tool for applying compression, most suitable as an edible nutshell remover, comprises a pair of elongated legs (10,12) hingedly attached at one end (14), with roughened jaw sections (30,34) adjacent the hinge and grasping sections (32,36) remote from the hinge. The legs are shaped such that when they are closed as far as possible the jaw opening diverges so that a nut or other workpiece can be placed at a location whereby maximum closure of the legs will crack the nutshell (42) without damaging the nutmeat (44). Also the jaw sections are curved in a matching convex-concave configuration so that when the legs are closed, the jaw sections will exert a combination of compression and rolling or shear forces upon the workpiece placed therebetween, so as to enhance the effect of the compressive force applied to the workpiece.

11 Claims, 4 Drawing Figures

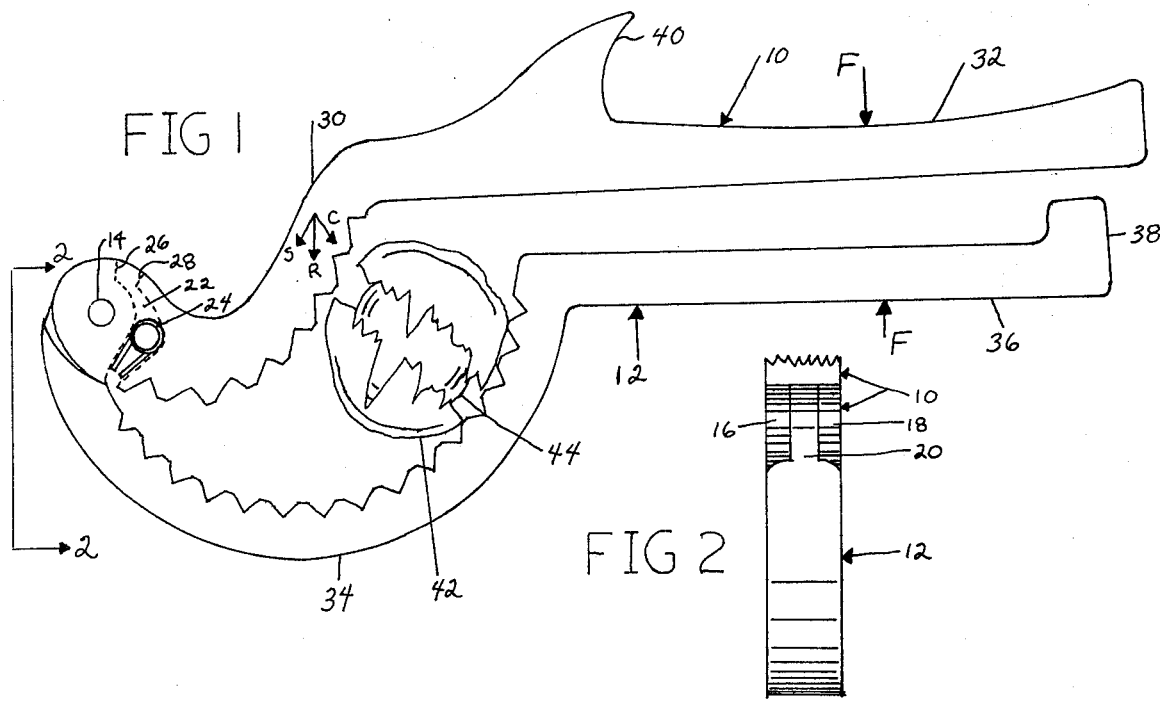
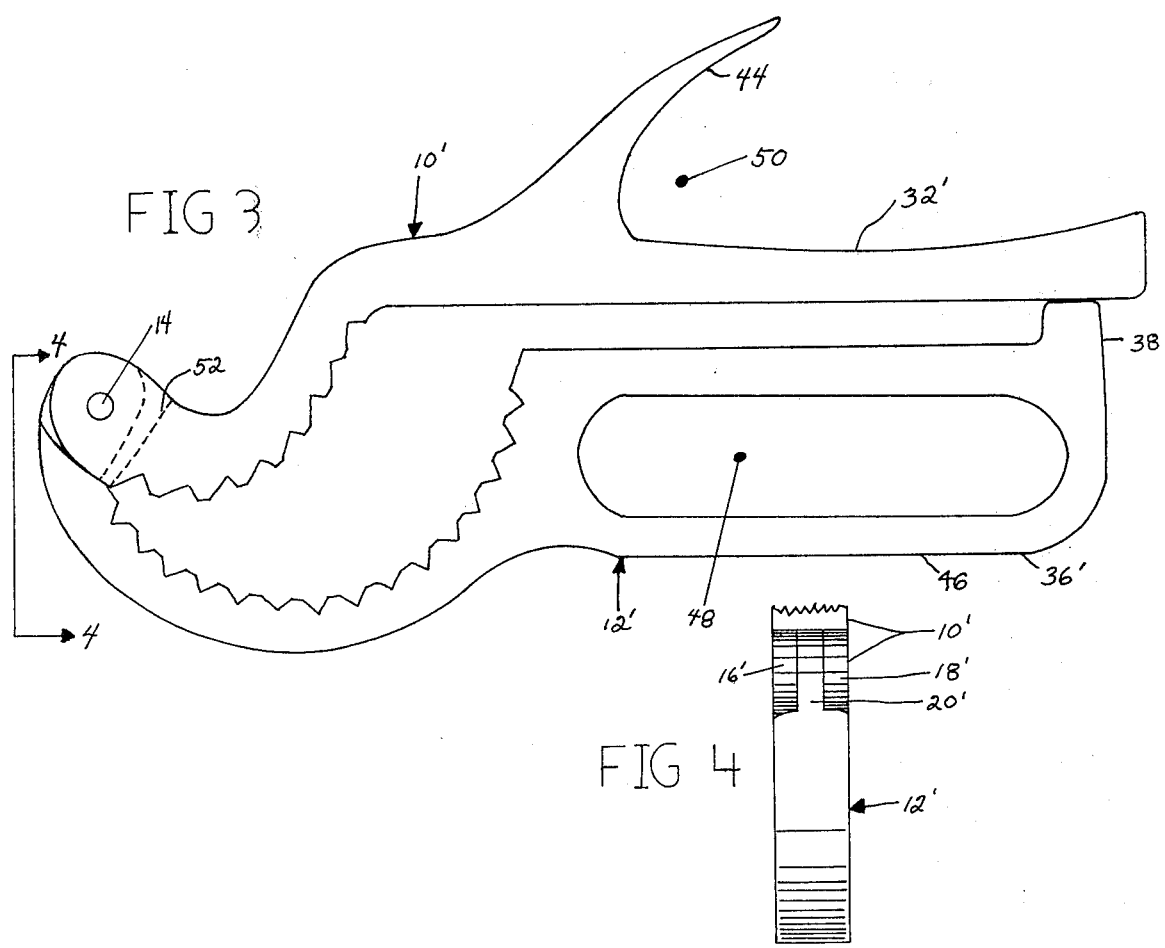

COMPRESSION TOOL, USEABLE AS NUTSHELL REMOVER

This application is a continuation of application Ser. No. 249,849, filed Apr. 1, 1981, and abandoned as of the filing date of this application.

BACKGROUND

1. Field of Invention

This invention relates to a compression-producing tool, particularly to such a tool which provides a superior compression effect; its most advantageous use is as a nutshell remover which can crack and remove the shells of nuts more efficiently and without damage to the nutmeat.

2. Description of Prior Art

Heretofore most tools or devices for producing compression on a workpiece did so directly, using some form of force multiplication, usually a form of lever action. When used as a nutcracker, such tools usually comprised a pair of straight-legged members, hinged together at one end and having mutually opposed roughened jaw sections on the legs adjacent the hinge and a grasping section remote from the hinge, toward the other end of the legs. This nutcracker had many serious disadvantages. First, it is correctly termed a nutcracker since its only function is to crack the shell of a nut, whereafter the shell usually has to be removed manually in a series of subsequent, often difficult operations. Second, excessive force was usually required; such a nutcracker thereby could not be operated by persons with weak grasping abilities, such as children and the elderly. Moreover such a device was not able to crack nuts with extremely hard shells, such as the macadamia. Third, and partly because of the excessive force required, in addition to cracking the shell of the nut, the typical nutcracker often cracked or damaged the nutmeat, a highly undesirable effect.

Various other types of nutshell crackers or removers were used heretofore, but these also had serious disadvantages as afore noted. In addition, many were complicated and expensive and not suitable for everyday use.

Accordingly several objects of the invention are to provide a compression-producing tool which can be operated with substantially reduced force and thereby with more efficiency, to provide a nutshell remover which is reliable, simple, and inexpensive, to provide a nutshell remover which will crack and remove the shell of a nut without damaging the meat thereof, and to provide such a device which effectively can partly remove ans well as crack the shell of a nut. Further objects and advantages of the invention will become apparent from a consideration of the ensuing description thereof.

DRAWINGS

FIG. 1 is a preferred embodiment of my invention wherein a spreading spring is employed;

FIG. 2 is a partial end view of FIG. 1 taken along the lines 2—2.

FIG. 3 is a side view of an alternative embodiment of the invention wherein loop and half-loop handles are employed in lieu of a spreading spring;

FIG. 4 is an end view of the embodiment of FIG. 3 taken along the lines 4—4.

FIGS. 1 and 2—DESCRIPTION

The tool of FIGS. 1 and 2 comprises a pair of generally elongated members 10 and 12 which are hingedly attached together at their left ends by a force- or press-fit pin 14. The overall length of the tool is about 18.5 cm (7.5 in) and its overall height is about 9 cm (3.5 in). Other dimensions are scaled as shown. The width of the legs as depicted in FIG. 2 is about 13 mm (0.5 in) for a tool made of aluminum stock, but if a stronger metal such as brass or stainless steel is used, the thickness may be reduced.

Viewed from its end, as shown in FIG. 2, the left, hinged end of upper leg 10 is divided into two spaced fingers 16 and 18 and the corresponding end of lower leg 12 narrows into a single finger 20 which is sandwiched between fingers 16 and 18 at the hinge location so that the sides of the tool are flat. The split portion between fingers 16 and 18 of upper leg 10 extends into a recess 22 (FIG. 1) which is slightly undercut so as to captivate a coil spring 24 with two extending legs, one of which presses against the side of recess 22 of upper leg 10 and the other of which presses against the end of lower leg 12, thereby to tend to spread legs 10 and 12. A portion of the left end of lower leg 12 extends up to provide a stop 26 which is designed to meet a similar stop 28 of upper leg 10 when the legs are spread, thereby to limit the maximum angle of opening of legs 10 and 12.

In lieu of spring 24 positioned in recess 22, legs 10 and 12 can be urged apart by a similar spring mounted around hingepin 14 or by other means known in the art.

Leg 10 has a jaw section 30 adjacent the hinge and a grasping section 32 remote from the hinge end. Similarly leg 12 has a jaw section 34 adjacent the hinge end and a grasping section 36 remote from the hinge end. The right end of leg 12 has an upright extension 38 which is designed to meet the lower face of section 32 when the legs are squeezed together, thereby to limit the maximum closure of legs 10 and 12. Upper leg 10 also has an upright extending hand stop or guard portion 40.

Starting from its hinge end, it can be seen that lower leg 12 extends, in a circular arc for about 180°, first extending down and then curving up to provide a concave jaw section. For purposes of example, jaw section 34 has crested teeth. From the right end of jaw section 34, leg 12 extends straight horizontally to the right to provide grasping section 36.

Starting from the hinged end, upper leg 10 first extends downwardly to the lower right and then curves upwardly to provide a convex jaw section which for purposes of example also has crested teeth and which mates with the concavity of jaw section 34. Thereafter, leg 10 extends straight to the right to provide grasping section 32, parallel to grasping section 36. When the tool is fully closed so that section 32 meets extension 38, jaw section 30 and 34 will be separated (except at the hinge area), the separation increasing as a function of distance from the hinge. A workpiece is placed between jaw sections 30 and 34. The workpiece illustrated is an edible nut, comprising a shell 42 (being cracked and removed) and an inner nutmeat 44.

FIGS. 1 AND 2—OPERATION

In operation, when the tool of FIG. 1 is not held, or is held very lightly, spring 24 will spread legs 10 and 12 apart such that jaw sections 30 and 34 will be wide enough to accomodate relatively large nuts and other workpieces. To use the tool to remove the shell from a nut, the jaws are allowed to spread and the nut is placed between jaw sections 30 and 34 as far from hingepin 14 as is felt possible, while still enabling the jaws to exert pressure on the nut when the handles are squeezed closed. In practice this position is very easy to judge and can be accomplished in an instant by holding the grasping section loosely in the preferred hand, inserting the nut in the jaw section with the other hand, closing the tool lightly, and sliding the nut to the appropriate position where leg 10 almost contacts extension 38 of leg 12.

Then grasping sections 32 and 36 are squeezed together by the application of force, as indicated by the symbols F-F. As indicated on jaw section 30, I believe that nut 40 thereupon experiences a combination of compressive force (C) and rolling or shearing force (S) to provide a resultant force (R) which is a combination of the compressive and shear forces. The compressive force will be primarily useful in cracking the nut and the rolling or shear component will be useful in aiding and reducing the necessary cracking force and in separating and removing the cracked shell sections from nutmeat 44, as indicated.

The combination of compressive and shearing forces is provided because of the curvature of jaw sections 30 and 34 and the fact that the orientation of the portion of the jaw sections which hold the nut is different from the orientation of the portion of the legs at the hinge. If the legs were straight, as in a conventional nutcracker, the only force exerted upon nut 40 would be direct compression. However by virtue of the provision of curved jaw sections and the placement of the nut to be cracked in a portion of the jaw section which has a different orientation direction than the portion of the leg at the hinge, when the legs are squeezed together the corresponding points of the jaw sections will not move directly together as in a conventional, straight-legged nutcracker, but will provide a combination sliding or shearing and compressive, or wedgelike movement, to exert the shearing and compressive forces noted, thereby to provide a far more effective action which cracks and tends to remove and separate the shell and which enhances the effect of the compressive force.

In addition, by virtue of the provision of stop extension 38, in combination with jaw sections 30 and 34 whose separation increases when the nutshell remover is fully closed at corresponding points as a function of distance from hinge 14, nut 40 can be placed at a position in the jaw sections whereby it will be possible to crack and remove the shell of the nut while not being able to move the legs close enough together to damage the nutmeat.

By virtue of the fact that compressive and shearing forces are used, I have found that all nuts can be cracked with substantially less effort than in a conventional nutcracker, and that even the extremely hard and thick shells of macadamia nuts can be cracked with relative ease by persons with relatively weak grasping strength. The design of my nutshell remover is also very simple, having only two moving parts, and is therefore reliable and economical. Also compressive force can be applied to other workpieces with more efficiency, so that the tool may be used as a more efficient screw-top bottle cap remover, pipe wrench, etc.

FIGS. 3 AND 4—ALTERNATIVE EMBODIMENT

In the alternative embodiment of FIGS. 3 and 4, in lieu of a leg-spreading spring 24, grasping sections 32' and 36' are provided with respective spaced secondary members 44 and 46. Secondary member 46 is shaped to provide lower leg 12' with a loop portion 48 through which the fingers of the hand can be inserted, and secondary member 44 provides upper leg 10' with a recess portion 50 into which the thumb or hand can be placed. Thereby legs 10' and 12' can be easily spread open with one hand by separating the thumb from the fingers of the hand, in similar fashion to operation of a conventional scissors. Since no spring is employed, no spring recess is provided, but fingers 16' and 18' of upper leg 10' terminate at 52 (FIG. 3) and finger 20' of lower leg 12' has a smooth curvature since no stop need be provided in this embodiment.

While the above description contains many specificities, these should not be construed as limitations upon the scope of the invention, but rather as an exemplification of several preferred embodiments thereof. Various other embodiments and ramifications will occur to those skilled in the art. For example in lieu of crested teeth, all teeth can be made uncrested if a hard metal is used which will be less subject to wear. In lieu of sawteeth as shown, either crested or uncrested, other types of roughened jaw surfaces, such as knurled, can be employed. While described for use primarily as a nutcracker, the device of the invention, because of its superior, more efficient gripping action, can also be used on other workpieces, such as a screw-top bottle remover, pipe wrench, etc., as indicated. Also, while I believe that the above-presented theory of operation is accurate, I do not wish to be bound thereby since other and/or alternative theories of operation which explain the improved results of my nutshell remover may be applicable. Accordingly the scope of the invention should be determined only by the appended claims and their legal equivalents.

I claim:
1. A tool comprising:
a pair of elongated legs hingedly attached together at one end of each leg by a common hinge,
each leg having a jaw section adjacent said hinge,
the entire length of each jaw section having a roughened, grasping surface facing the jaw section of the other leg,
each leg also having a manual holding section remote from said hinge, whereby any force applied to said manual holding sections will be multiplied at said jaw sections,
said tool being characterized in that:
(1) the entire jaw section of each of said legs is curved, the surface of the entire jaw section of one leg which faces that of the other leg having a concave curvature which is circular in shape, and the surface of the entire jaw section of the other leg which faces said one leg having a convex curvature,
(2) said hinge is oriented away from any center of curvature of either of said jaw sections, and
(3) said jaw sections are shaped and oriented so that:
(a) when any generally spherical workpiece within a predetermined size range is placed at any location within said jaw sections and in contact with both of said jaw sections and said legs are squeezed together, all corresponding portions of said jaw sections will move in a combination of direct motion together and relative sliding motion such that said workpiece will experience a combination of compressive and shear forces from movement of said jaw sections, regardless of the location at which said workpiece is placed within said jaw sections, and (b) the separation between corresponding points of said jaw sections increases as a function of the distance from said hinge when said legs are rotated together to a position in contact with each other.

2. The tool of claim 1 wherein said manual holding section of each leg extends in a generally different direction from the outer portion of the jaw section of its leg, said manual holding section being joined to its adjacent jaw section by a bend in each leg.

3. The tool of claim 1 wherein the jaw section of each of said legs has a sawtooth-shaped surface.

4. The tool of claim 1 further including means for limiting the angle by which said legs can be rotated apart.

5. The tool of claim 1 further including spring means for rotatively urging said legs apart.

6. The tool of claim 1 wherein the manual holding section of at least one of said legs has two spaced portions between which the fingers or thumb of a human hand can be inserted so that said other member will follow opening and closing motions of said hand.

7. The tool of claim 6 wherein the manual holding section of the other of said legs also has two spaced portions between which the thumb or fingers of a hand can be inserted so that said other member will follow opening and closing motions of said hand.

8. A tool comprising a pair of hingedly-attached legs, each leg having a jaw section adjacent the hinged part of said leg, each leg having a holding section remote from the hinged portion of said leg for receiving applied energy in the form of mutually-facing motions, whereby compressive force applied at said holding sections will be multiplied at said jaw sections, the facing surfaces of the entire length of each of said jaw sections having (a) roughened grasping means, and (b) respective concave and convex curvatures which extend for the entire length of said jaw sections, said concave jaw section having a circular curvature, and said jaw sections also being shaped and oriented with respect to the hinged attachment of said legs so that compressive and shear forces will be simultaneously applied to opposite sides of any solid workpiece having a thickness within a predetermined range when said workpiece is placed at any location between said jaw sections, the spacing between corresponding points of said jaw sections increasing in proportion to the distance from said hinge when said legs are moved to a position together.

9. The tool of claim 8 wherein means are included for limiting the extent of compressive movement applied to said energy receiving means, thereby to limit crushing of said workpiece.

10. The tool of claim 8 wherein the holding section of each leg extends in a generally different direction from the outer portion of the jaw section of its leg, each holding section being joined to its adjacent jaw section by a bend in each leg.

11. The tool of claim 8 further including spring means for rotatively urging said legs apart.

* * * * *